Patented Mar. 13, 1951

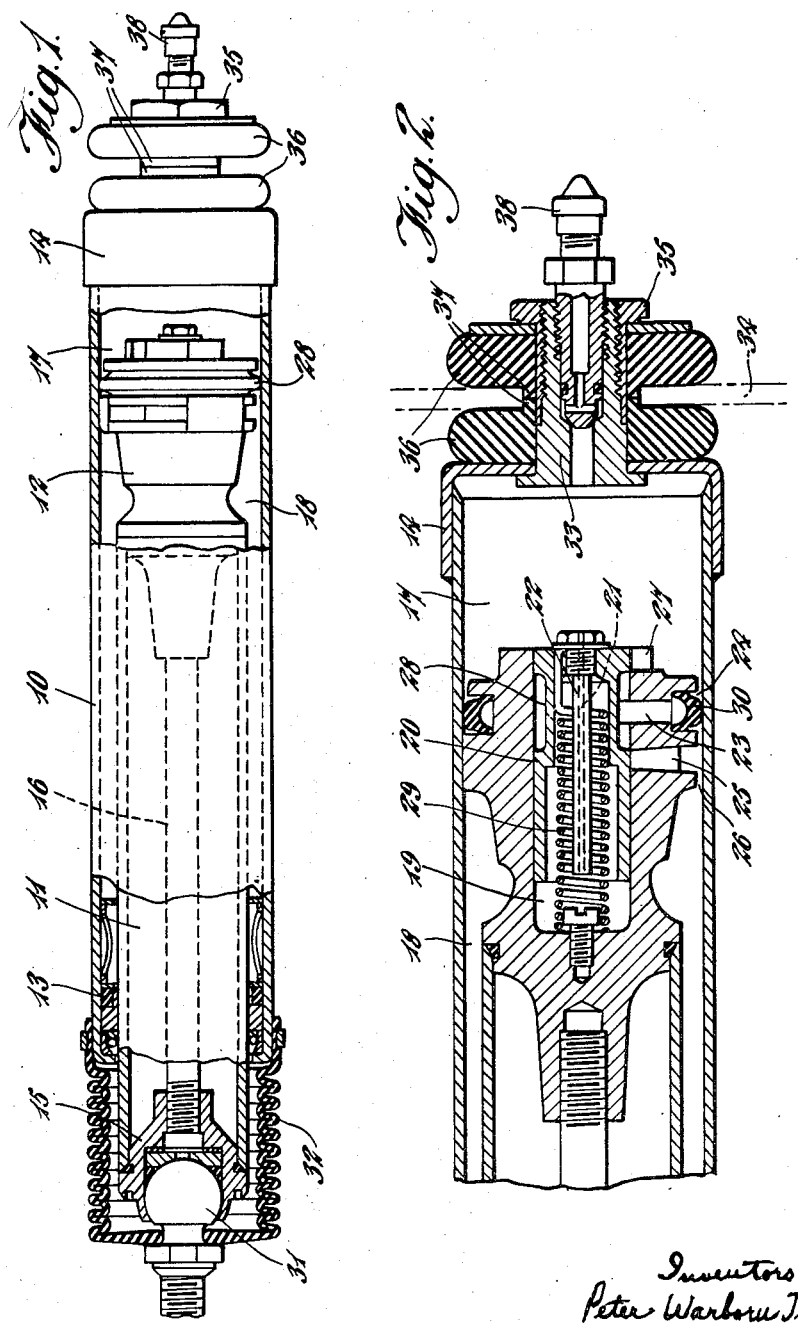

2,545,394

UNITED STATES PATENT OFFICE 2,545,394

SUSPENSION DEVICE AND SHOCK ABSORBER FOR VEHICLES

Peter Warborn Thornhill and Clive Austin Gosling, Leamington Spa, England, assignors to Levitation Limited, Leamington Spa, England Application September 16, 1949, Serial No. 116,156
In Great Britain October 4, 1948

1 Claim. (Cl. 267—64)

This invention relates to suspension devices and shock absorbers for vehicles, which comprise telescopic plunger and cylinder units containing fluid which, during compression and extension of the units, passes from one working chamber to another, control of the passage of the fluid being effected by valves, restricted orifices or the like to provide damping of the movements of the unit.

More particularly, the invention relates to units as above set out in which one working chamber is between the head of the cylinder and a piston head mounted on the plunger, and the other working space is the annular chamber below the piston head between the walls of the plunger and cylinder, and in which direct passage of fluid past the piston head is prevented by a sealing device which acts also as a valve to permit passage of fluid from either side of the piston head to a space the connection of which to either of the working spaces is selectively controlled by additional valve means. Such units are hereinafter called "units of the kind referred to."

According to the invention, in a unit of the kind referred to, the sealing device comprises a ring of rubber or like flexible and resilient material mounted in a circumferential groove in the piston head, the groove being connected by passages with an internal recess in the piston head in which the additional valve means are located, and the ring being formed with two lips one of which co-operates with one side of the groove and the other with the other side, to provide a pair of one-way valves each controlling the connection between one working space and the internal recess.

The ring is preferably substantially U-shaped in cross section with the base of the U forming the outer peripheral surface of the ring.

The invention is hereinafter described with reference to the accompanying drawings, in which:

Figure 1 is a longitudinal section through a pneumatic suspension device for a motor vehicle which incorporates the invention, the plunger of the said device being shown in elevation; and Figure 2 is a longitudinal section, on an enlarged scale, through the plunger head of the device shown in Figure 1.

Referring to the drawings, which illustrate a pneumatic suspension device similar to that described with reference to Figures 1 to 3 of the drawings of British Patent Specification No. 570,813, the device comprises a cylinder 10, and plunger 11, the plunger having a piston head 12 which fits slidably in the cylinder, and projecting through a packing 13 at one end of the cylinder, the other end of which is closed by a head 14. The plunger is tubular, and is clamped between the piston head 12 and an outer end closure plug 15 by a central stem 16 screw-threaded at its ends to engage screw-threaded sockets in the piston head and plug. The working spaces of the device are the space 17 between the cylinder head 14 and the piston head 12, and the annular space 18 around the plunger, between the piston head 12 and the packing 13.

A co-axial recess 19 is formed in the piston head 12, opening into the working space 17, and, slidable in the said recess, is a valve member 20 one end of which is exposed to the pressure in the working space 17, the recess being connected to the said working space by a passage 21 of small diameter, which extends through a stem 22 mounted in the valve member.

Two rings of radial ports lead from the peripheral surface of the piston head 12 into the recess 19, the ring of ports 23 nearer to the working space 17 opening at their outer ends into a circumferential groove 24 in the piston head, whilst the other ring of ports 25 open into relieved portions 26 of the peripheral surface of the head. Radial slots 27 are formed in the end of the head which faces the working space 17, and the valve member 20 is formed with a circumferential groove 28 which has a width equal to the distance between the proximate edges of the ports 25 and the slots 27. Displacement of the valve member 20 in either direction from a middle position thus connects the ports 23 to either the ports 25 or the slots 27. A spring 29 is provided which acts on the valve member 20 and tends to keep it substantially in the middle position.

In the groove 24 there is mounted a sealing device, in the form of a ring 30 of rubber or like flexible and resilient material, the ring being of substantially U-shape in cross section, the base part of the U, which forms the outer peripheral part of the ring, being of considerable thickness, whilst the sides taper towards their extremities, and form radially inwardly directed lips which are much more flexible than the base. As shown, the ring is of progressively decreasing thickness from the centre of the base of the U to the extremity of each lip. The sides of the U-shaped ring bear on the side walls of the groove, against which they are urged by pressure acting within the groove, so that the ring prevents outward flow of fluid from the ports 23 into either of the working spaces, but allows flow from either of the working spaces into the ports 23.

The plug 15 forms a socket for a ball-headed pin 31 by means of which the plunger is attached to one of the members between which the suspension device is mounted, and a flexible boot 32 of rubber or like material, through which the pin 31 extends, encloses the part of the plunger which projects from the cylinder. A stem 33 projecting through the cap 14 provides a mounting for the cylinder, the stem 33 being passed through a hole in a flat mounting bracket 34 and retained by a nut 35, two rubber discs 36 being placed one on each side of the bracket to give flexibility to the mounting. The discs 36 have short spigots 37 which enter the hole in the bracket 34. The fluid used in the suspension device is air, and an inflation valve 38 is provided in the stem 33 through which air can be pumped into the device.

The device operates in the following manner. When a vehicle on which the suspension is provided by a plurality of such devices is stationary, or is travelling on a perfectly smooth surface, the plungers take up a position in the cylinders such that the air pressure in the devices just supports the weight of the vehicle. If a wheel strikes a bump in the road, and is lifted, the plunger in the suspension device between that wheel and the body of the vehicle rises, increasing the air pressure in the working space 17. As the recess 19 is connected to the space 17 only by the narrow passage 21 the pressure in the recess rises much more slowly than the pressure in the space 17, and the valve member 20 is therefore displaced into the recess, allowing fluid to pass from the working space 17 into the working space 18, the fluid passing one lip of the ring 30 and flowing through the ports 23, groove 28 and ports 25 into the working space 18. When the device ceases to shorten, the air is unable to return through the same path to the chamber 17, as the lip of the ring 24 which lifted to allow the passage of fluid in the other direction is pressed against the side of the groove 24. As the device extends, however, the pressure in the working space 17 falls until it is below that in the recess 19, allowing the valve member 20 to move and connect the ports 23 to the slots 27. Air can then pass the other lip of the ring 30 from the working space 18 into the ports 23, and can flow through the groove 28 and slots 27 into the working space 17. The device thus returns smoothly to its static position.

If a wheel of the vehicle drops into a pothole or like depression, the plunger moves downwardly, and the pressure in the working space 17 falls, so that the valve member 20 moves upwardly, and fluid from the space 18 flows past the lower lip of the ring 30, through the ports 23, groove 28 and slots 27 into the working space 17. When the plunger ceases to move downwardly, and tends to return, air is prevented by the non-return valve action of the ring 30, from returning to the working space 18 until the pressure in the space 17 has risen sufficiently to displace the valve member 20 and connect the ports 23 and 25.

The ring 30 at all times prevents fluid from flowing directly from one working space to the other, but permits flow from either of the working spaces into the recess 19.

What we claim is:

A suspension device for vehicles comprising a cylinder, a plunger including a piston head slidable in said cylinder and the plunger having a stem projecting through one end of said cylinder, said piston head defining, within said cylinder, an annular working chamber surrounding said plunger stem, and a cylindrical working chamber on the side of said piston head opposite to the plunger stem, a recess in said piston head open to the cylindrical working chamber, a valve member slidable in said recess and urged inwardly of said recess by fluid pressure in said cylindrical working chamber, means in said recess acting to urge said valve member outwardly, passage means in said piston head connecting said annular working space to said recess, a circumferential groove surrounding said piston head, additional passage means in said piston head connecting said circumferential groove to said recess between the passage means connecting the annular working space to said recess and the open end of the recess, a circumferential recess in said valve member adapted, on displacement of said valve member to either side of a mean position, to provide communication between said additional passage means and said cylindrical working space and said annular working space respectively, and a sealing device in said circumferential groove comprising an imperforate ring of flexible and resilient material bearing against the cylinder wall, two inwardly deformable lips being provided on said ring one of which co-operates with one side of the groove and the other of which co-operates with the other side of the groove to provide a pair of one-way valves each controlling communication between one working space and the recess in the piston head by way of the additional passage means.

PETER WARBORN THORNHILL.
CLIVE AUSTIN GOSLING.

REFERENCES CITED

The following references are of record in the file of this patent:

UNITED STATES PATENTS

| Number | Name | Date |
|---|---|---|
| 1,612,039 | Miller | Dec. 28, 1926 |
| 1,899,271 | Hammond | Feb. 28, 1933 |
| 2,098,398 | Marcier | Nov. 9, 1937 |
| 2,476,228 | Thornhill | July 12, 1949 |